(12) United States Patent
O'Brien et al.

(10) Patent No.: US 10,086,956 B2
(45) Date of Patent: Oct. 2, 2018

(54) LIGHT ADJUSTMENT CONTROL FOR CAMERAS OF AN AERIAL VEHICLE

(71) Applicant: Amazon Technologies, Inc., Seattle, WA (US)

(72) Inventors: Barry James O'Brien, Seattle, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 39 days.

(21) Appl. No.: 15/008,108

(22) Filed: Jan. 27, 2016

(65) Prior Publication Data

US 2017/0210486 A1    Jul. 27, 2017

(51) Int. Cl.
| | |
|---|---|
| *B64D 47/08* | (2006.01) |
| *B64C 39/02* | (2006.01) |
| *B64C 1/06* | (2006.01) |
| *H04N 7/18* | (2006.01) |
| *B64C 27/22* | (2006.01) |
| *H04N 5/238* | (2006.01) |
| *H04N 5/235* | (2006.01) |
| *H04N 5/225* | (2006.01) |

(Continued)

(52) U.S. Cl.
CPC .............. *B64D 47/08* (2013.01); *B64C 1/062* (2013.01); *B64C 27/08* (2013.01); *B64C 27/22* (2013.01); *B64C 39/024* (2013.01); *B64C 39/08* (2013.01); *H04N 5/2252* (2013.01); *H04N 5/2254* (2013.01); *H04N 5/238* (2013.01); *H04N 5/2351* (2013.01); *H04N 5/2352* (2013.01); *H04N 7/185* (2013.01); *B64C 2201/024* (2013.01); *B64C 2201/042* (2013.01); *B64C 2201/127* (2013.01)

(58) Field of Classification Search
CPC ...................................................... B64D 47/08
See application file for complete search history.

(56) References Cited

U.S. PATENT DOCUMENTS

| 2,899,878 A | 8/1959 | Farinet |
| 2,998,762 A | 9/1961 | Goddard |

(Continued)

FOREIGN PATENT DOCUMENTS

| DE | 102005020593 A1 | 11/2006 |
| DE | 102014006340 A1 | 11/2015 |

(Continued)

OTHER PUBLICATIONS

International Search Report and Written Opinion for PCT Application No. PCT/US2017/014994 dated Apr. 7, 2017.

*Primary Examiner* — Frederick D Bailey
(74) *Attorney, Agent, or Firm* — Athorus, PLLC

(57) ABSTRACT

This disclosure describes an aerial vehicle that includes a light alteration assembly that may be used to alter light entering a lens of a camera of the aerial vehicle. The light alteration assembly may include an adjustable visor and/or filters that may be selectively positioned over the lens of the camera. By altering light entering the lens of a camera of the aerial vehicle, the camera is able to obtain higher quality images of the area surrounding the aerial vehicle. The higher quality images may then be processed to accurately detect objects within a vicinity of the aerial vehicle.

20 Claims, 7 Drawing Sheets

(51) Int. Cl.
*B64C 39/08* (2006.01)
*B64C 27/08* (2006.01)

(56) References Cited

U.S. PATENT DOCUMENTS

| | | | | |
|---|---|---|---|---|
| 4,041,308 | A * | 8/1977 | Fujita | G03B 11/00 |
| | | | | 250/214 P |
| 6,256,057 | B1 * | 7/2001 | Mathews | G01C 11/02 |
| | | | | 348/144 |
| 8,866,920 | B2 * | 10/2014 | Venkataraman | H04N 5/2253 |
| | | | | 348/218.1 |
| 2007/0002143 | A1 * | 1/2007 | Elberbaum | H04N 17/002 |
| | | | | 348/188 |
| 2009/0302634 | A1 * | 12/2009 | Suzuki | B60J 3/02 |
| | | | | 296/97.6 |
| 2011/0123182 | A1 * | 5/2011 | Henry | G03B 7/28 |
| | | | | 396/89 |
| 2014/0192414 | A1 | 7/2014 | Longerich et al. | |
| 2014/0263822 | A1 * | 9/2014 | Malveaux | B64C 39/024 |
| | | | | 244/17.23 |
| 2014/0339372 | A1 * | 11/2014 | Dekel | B64C 29/0033 |
| | | | | 244/7 R |
| 2015/0210388 | A1 * | 7/2015 | Criado | B64C 39/10 |
| | | | | 701/3 |
| 2017/0183074 | A1 * | 6/2017 | Hutson | B64C 1/061 |

FOREIGN PATENT DOCUMENTS

| | | |
|---|---|---|
| EP | 3653887 B1 | 9/1999 |
| EP | 2937123 A1 | 10/2015 |
| FR | 3007295 A1 | 12/2014 |
| JP | S6066243 A | 4/1985 |
| JP | 2001199492 A | 7/2001 |

\* cited by examiner

LIGHT ADJUSTMENT CONTROL FOR CAMERAS OF AN AERIAL VEHICLE

BACKGROUND

Multi-propeller aerial vehicles (e.g., quad-copters, octo-copters) are becoming more common. Many of these vehicles include a frame that supports the multiple propellers, control components, the power supply (e.g., battery), cameras, etc. Images obtained from the cameras may be used for photography, and/or other purposes. However, based on the position (e.g., altitude, coordinate position, heading, or orientation) of the aerial vehicle, the quality of the images may be reduced due to sunlight, shadows, etc.

BRIEF DESCRIPTION OF THE DRAWINGS

The detailed description is set forth with reference to the accompanying figures.

Figure 1:
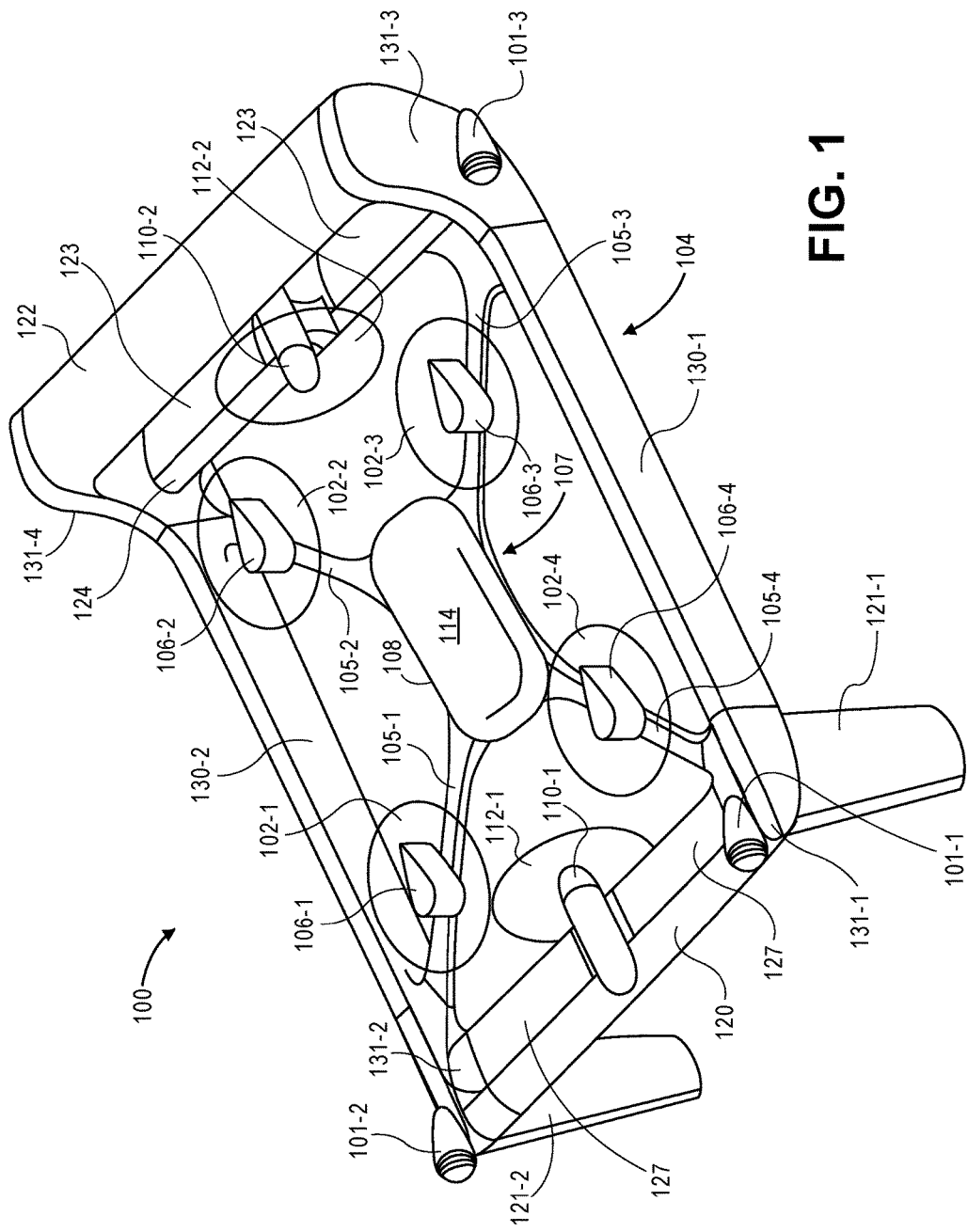
FIG. 1 depicts a view of an aerial vehicle configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a configuration of an aerial vehicle, such as an unmanned aerial vehicle ("UAV") that includes a frame that provides structural support to the aerial vehicle, includes cameras and camera enclosures at different locations on the frame, and provides vertical lift to the aerial vehicle as the aerial vehicle moves in a direction that includes a horizontal component. The aerial vehicle also includes one or more light alteration assemblies that may be used to alter light entering a lens of a camera. In some implementations, each camera and/or camera enclosure may include a separate and independently adjustable light alteration assembly. Each light alteration assembly may include an adjustable visor and/or one or more filters that are positionable over the lens of the camera(s) positioned within each camera enclosure.

In one implementation, a visor of the light alteration assembly may be coupled to the frame of the aerial vehicle adjacent each camera enclosure. The visor may be retracted toward or into the frame when not in use or may be extended from the frame and positioned to block, reduce, or otherwise alter light (e.g., sunlight) from a light source (e.g., the sun) prior to the light entering the lens of the camera(s) positioned within the camera enclosure. Likewise, in some implementations, the camera enclosure may include one or more filters that may be positioned in front of the lens of the camera(s) to filter, block, or otherwise alter light from a light source prior to the light entering the lens of the camera(s).

As discussed further below, the components (e.g., visor, filters) of a light alteration assembly may be adjusted or positioned based on the current lighting conditions to improve the quality of the images obtained by the camera of the aerial vehicle. For example, if the intensity of light entering the lens of the camera is too high such that an image will appear overexposed, washed out, blurry, and/or the contrast of the image is reduced, the visor and/or a filter of the light alteration assembly may be utilized to improve the lighting conditions experienced by the camera (e.g., by shading or filtering the light entering the lens of the camera) and, thus, the resulting image obtained by the camera is improved. By improving the image quality of obtained images, the accuracy of image processing, such as object detection, is likewise improved. Likewise, in some implementations, image processing algorithms may utilize information regarding the position of the light alteration assembly as part of the image processing. For example, an image processing algorithm may utilize a first image obtained before the light alteration assembly is positioned to alter light and utilize an image obtained after the light alteration assembly is positioned to alter light. The two images may be combined to generate a high dynamic range ("HDR") image.

The aerial may have any number cameras and corresponding camera enclosures. For example, a camera enclosure may be positioned at each corner of the frame of the aerial vehicle and one or more cameras may be positioned within each camera enclosure. For example, each camera enclosure may contain four cameras positioned at different angles to provide a view from all directions of that portion of the aerial vehicle.

The aerial vehicles described herein have the unique properties of operating in which flight is substantially vertical with limited or no horizontal component, or operating in which flight is substantially horizontal with limited or no vertical component. For example, during takeoff, landing, and/or payload delivery, the flight of the aerial vehicle is substantially vertical with limited or no horizontal component (referred to herein generally as "vertical flight"). Likewise, when the aerial vehicle is navigating between two locations (e.g., origin and destination), the flight is substantially horizontal with limited or no vertical component (referred to herein generally as "horizontal flight"). During vertical flight the aerial vehicle is at a low altitude (e.g., less than 15 meters) and moving at a low speed (e.g., between 1 kilometer per hour and 8 kilometers per hour). As such, the aerodynamics of the aerial vehicle are of less importance than the position of the aerial vehicle and the ability of the aerial vehicle to accurately detect and avoid objects, such as trees, buildings, and humans, located within this lower altitude. In comparison, during horizontal flight, the aerial vehicle is at a higher altitude and moving at a higher speed. As such, the aerodynamics of the aerial vehicle are of higher importance and, because there are fewer objects, detection and avoidance are simplified.

To aid in object detection and avoidance, especially during vertical flight, cameras of the aerial vehicle may be used to obtain images of the area surrounding the aerial vehicle. Those images are processed to detect any objects represented in the image. Any one of a variety of image processing techniques known in the art, such as object detection, edge detection, etc., may be used to process the images to detect objects represented in the images. For image processing, the higher the quality of the image, the better and more accurate the detection of objects represented in the image. For example, an image that is overexposed due to a high intensity of light entering the lens of the camera may result in poor object detection. In comparison, a properly exposed image may be processed and objects represented in the image properly detected.

To improve the quality of an image, the light entering the lens of the camera may need to be blocked, filtered, or otherwise altered. Accordingly, during vertical flight in which aerodynamics are of lower priority, a visor may be extended from the frame of the aerial vehicle and positioned between the camera and a light source to block a portion of the light from the light source from entering the lens of the camera. Alternatively, or in addition thereto, a filter may be selected and positioned over the lens of the camera that alters the light before it enters the lens of the camera.

FIG. 1 illustrates a view of an aerial vehicle 100, according to an implementation. As illustrated, the aerial vehicle 100 includes a perimeter frame 104 that includes a front wing 120, a lower rear wing 124, an upper rear wing 122, and two horizontal side rails 130-1, 130-2. The horizontal side rails 130 are coupled to opposing ends of the front wing 120 and opposing ends of the upper rear wing 122 and lower rear wing 124. In some implementations, the coupling may be with a corner junction, such as the front left corner junction 131-1, the front right corner junction 131-2, the rear left corner junction 131-3, the rear right corner junction 131-4. In such an example, the corner junctions are also part of the perimeter frame 104. In some implementations, each corner junction may include a camera enclosure 101-1, 101-2, and 101-3. An example corner junction 131 and example camera enclosures 101 are discussed further below.

The components of the perimeter frame 104, such as the front wing 120, lower rear wing 124, upper rear wing 122, side rails 130-1, 130-2, and corner junctions 131 may be formed of any one or more suitable materials, such as graphite, carbon fiber, aluminum, titanium, etc., or any combination thereof. In the illustrated example, the components of the perimeter frame 104 of the aerial vehicle 100 are each formed of carbon fiber and joined at the corners using corner junctions 131. The components of the perimeter frame 104 may be coupled using a variety of techniques. For example, if the components of the perimeter frame 104 are carbon fiber, they may be fitted together and joined using secondary bonding, a technique known to those of skill in the art. In other implementations, the components of the perimeter frame 104 may be affixed with one or more attachment mechanisms, such as screws, rivets, latches, quarter-turn fasteners, etc., or otherwise secured together in a permanent or removable manner.

The front wing 120, lower rear wing 124, and upper rear wing 122 are positioned in a tri-wing configuration and each wing provides lift to the aerial vehicle 100 when the aerial vehicle is moving in a direction that includes a horizontal component. For example, the wings may each have an airfoil shape that causes lift due to the airflow passing over the wings during horizontal flight.

Opposing ends of the front wing 120 may be coupled to a corner junction 131, such as the front left corner junction 131-1 and front right corner junction 131-2. In some implementations, the front wing may include one or more flaps 127 or ailerons that may be used to adjust the pitch, yaw, and/or roll of the aerial vehicle 100 alone or in combination with the lifting motors 106, lifting propellers 102, thrusting motors 110, thrusting propellers 112, and/or other flaps on the rear wings. In some implementations, the flaps 127 may also be used as a protective shroud to further hinder access to the lifting propellers 102 by objects external to the aerial vehicle 100. For example, when the aerial vehicle 100 is moving in a vertical direction or hovering, the flaps 127 may be extended to increase the height of the protective barrier around a portion of the lifting propellers 102.

In some implementations, the front wing 120 may include two or more pairs of flaps 127, as illustrated in FIG. 1. In other implementations, for example if there is no front thrusting motor 110-1, the front wing 120 may only include a single flap 127 that extends substantially the length of the front wing 120. If the front wing 120 does not include flaps 127, the lifting motors 106 and lifting propellers 102, thrusting motors 110, thrusting propellers 112 and/or flaps of the rear wings may be utilized to control the pitch, yaw, and/or roll of the aerial vehicle 100 during flight.

Opposing ends of the lower rear wing 124 may be coupled to a corner junction 131, such as the rear left corner junction 131-3 and rear right corner junction 131-4. In some implementations, the lower rear wing may include one or more flaps 123 or ailerons that may be used to adjust the pitch, yaw and/or roll of the aerial vehicle 100 alone or in combination with the lifting motors 106, lifting propellers 102, thrusting motors 110, thrusting propellers 112, and/or the flaps 127 of the front wing. In some implementations, the flaps 123 may also be used as a protective shroud to further hinder access to the lifting propellers 102 by objects external to the aerial vehicle 100. For example, when the aerial vehicle 100 is moving in a vertical direction or hovering, the flaps 123 may be extended, similar to the extending of the front flaps 127 of the front wing 120.

In some implementations, the rear wing 124 may include two or more flaps 123, as illustrated in FIG. 1. In other implementations, for example if there is no rear thrusting motor 110-2 mounted to the lower rear wing, the rear wing 124 may only include a single flap 123 that extends substantially the length of the lower rear wing 124. In other implementations, if the lower rear wing includes two thrusting motors, the lower rear wing may be configured to include three flaps 123, one on either end of the lower rear wing 124, and one between the two thrusting motors mounted to the lower rear wing 124.

Opposing ends of the upper rear wing 122 may be coupled to a corner junction 131, such as the rear left corner junction 131-3 and rear right corner junction 131-4. In some implementations, like the lower rear wing, the upper rear wing 122 may include one or more flaps (not shown) or ailerons, that may be used to adjust the pitch, yaw and/or roll of the aerial vehicle 100 alone or in combination with the lifting motors 106, lifting propellers 102, thrusting motors 110, thrusting propellers 112, and/or other flaps of other wings. In some implementations, the flaps may also be used as a protective shroud to further hinder access to the lifting propellers 102 by objects external to the aerial vehicle 100. For example, when the aerial vehicle 100 is moving in a vertical direction or hovering, the flaps may be extended, similar to the extending of the front flaps 127 of the front wing 120 or the flaps 123 of the lower rear wing 124.

The front wing 120, lower rear wing 124, and upper rear wing 122 may be positioned and sized proportionally to provide stability to the aerial vehicle while the aerial vehicle 100 is in horizontal flight. For example, the lower rear wing 124 and the upper rear wing 122 are stacked vertically such that the vertical lift vectors generated by each of the lower rear wing 124 and upper rear wing 122 are close together, which may be destabilizing during horizontal flight. In comparison, the front wing 120 is separated from the rear wings longitudinally such that the vertical lift vector generated by the front wing 120 acts together with the vertical lift vectors of the lower rear wing 124 and the upper rear wing 122, providing efficiency, stabilization and control.

In some implementations, to further increase the stability and control of the aerial vehicle 100, one or more winglets 121, or stabilizer arms, may also be coupled to and included as part of the perimeter frame 104. In the example illustrated with respect to FIG. 1, there are two front winglets 121-1 and 121-2 mounted to the underneath side of the front left corner junction 131-1 and the front right corner junction 131-2, respectively. The winglets 121 extend in a downward direction approximately perpendicular to the front wing 120 and side rails 130. Likewise, the two rear corner junctions 131-3, 131-4 are also formed and operate as winglets providing additional stability and control to the aerial vehicle 100 when the aerial vehicle 100 is moving in a direction that includes a horizontal component.

The winglets 121 and the rear corner junctions 131 may have dimensions that are proportional to the length, width, and height of the aerial vehicle 100 and may be positioned based on the approximate center of gravity of the aerial vehicle 100 to provide stability and control to the aerial vehicle 100 during horizontal flight. For example, in one implementation, the aerial vehicle 100 may be approximately 64.75 inches long from the front of the aerial vehicle 100 to the rear of the aerial vehicle 100 and approximately 60.00 inches wide. In such a configuration, the front wing 120 has dimensions of approximately 60.00 inches by approximately 7.87 inches. The lower rear wing 124 has dimensions of approximately 60.00 inches by approximately 9.14 inches. The upper rear wing 122 has dimensions of approximately 60.00 inches by approximately 5.47 inches. The vertical separation between the lower rear wing and the upper rear wing is approximately 21.65 inches. The winglets 121 are approximately 6.40 inches wide at the corner junction with the perimeter frame of the aerial vehicle, approximately 5.91 inches wide at the opposing end of the winglet and approximately 23.62 inches long. The rear corner junctions 131-3, 131-4 are approximately 9.14 inches wide at the end that couples with the lower rear wing 124, approximately 8.04 inches wide at the opposing end, and approximately 21.65 inches long. The overall weight of the aerial vehicle 100 is approximately 50.00 pounds.

Coupled to the interior of the perimeter frame 104 is a central frame 107. The central frame 107 includes a hub 108 and motor arms 105 that extend from the hub 108 and couple to the interior of the perimeter frame 104. In this example, there is a single hub 108 and four motor arms 105-1, 105-2, 105-3, and 105-4. Each of the motor arms 105 extend from approximately a corner of the hub 108 and couple or terminate into a respective interior corner of the perimeter frame. As discussed below with respect to FIG. 2, in some implementations, each motor arm 105 may couple into a corner junction 131 of the perimeter frame 104. Like the perimeter frame 104, the central frame 107 may be formed of any suitable material, such as graphite, carbon fiber, aluminum, titanium, etc., or any combination thereof. In this example, the central frame 107 is formed of carbon fiber and joined at the corners of the perimeter frame 104 at the corner junctions 131. Joining of the central frame 107 to the perimeter frame 104 may be done using any one or more of the techniques discussed above for joining the components of the perimeter frame 104.

Lifting motors 106 are coupled at approximately a center of each motor arm 105 so that the lifting motor 106 and corresponding lifting propeller 102 are within the substantially rectangular shape of the perimeter frame 104. In one implementation, the lifting motors 106 are mounted to an underneath or bottom side of each motor arm 105 in a downward direction so that the propeller shaft of the lifting motor that mounts to the lifting propeller 102 is facing downward. In other implementations, as illustrated in FIG. 1, the lifting motors 106 may be mounted to a top of the motor arms 105 in an upward direction so that the propeller shaft of the lifting motor that mounts to the lifting propeller 102 is facing upward. In this example, there are four lifting motors 106-1, 106-2, 106-3, 106-4, each mounted to an upper side of a respective motor arm 105-1, 105-2, 105-3, and 105-4.

In some implementations, multiple lifting motors may be coupled to each motor arm 105. For example, while FIG. 1 illustrates a quad-copter configuration with each lifting motor mounted to a top of each motor arm, a similar configuration may be utilized for an octo-copter. For example, in addition to mounting a motor 106 to an upper side of each motor arm 105, another lifting motor may also be mounted to an underneath side of each motor arm 105 and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 102 to lift the aerial vehicle 100 and any engaged payload, thereby enabling aerial transport of the payload.

Mounted to each lifting motor 106 is a lifting propeller 102. The lifting propellers 102 may be any form of propeller (e.g., graphite, carbon fiber) and of a size sufficient to lift the aerial vehicle 100 and any payload engaged by the aerial vehicle 100 so that the aerial vehicle 100 can navigate through the air, for example, to deliver a payload to a delivery location. For example, the lifting propellers 102 may each be carbon fiber propellers having a dimension or diameter of twenty-four inches. While the illustration of FIG. 1 shows the lifting propellers 102 all of a same size, in some implementations, one or more of the lifting propellers 102 may be different sizes and/or dimensions. Likewise, while this example includes four lifting propellers 102-1, 102-2, 102-3, 102-4, in other implementations, more or fewer propellers may be utilized as lifting propellers 102. Likewise, in some implementations, the lifting propellers 102 may be positioned at different locations on the aerial vehicle 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the aerial vehicle.

In addition to the lifting motors 106 and lifting propellers 102, the aerial vehicle 100 may also include one or more thrusting motors 110 and corresponding thrusting propellers 112. The thrusting motors and thrusting propellers may be the same or different than the lifting motors 106 and lifting propellers 102. For example, in some implementations, the thrusting propellers may be formed of carbon fiber and be approximately eighteen inches long. In other implementations, the thrusting motors may utilize other forms of propulsion to propel the aerial vehicle. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 104 and central frame 107 of the aerial vehicle 100 and utilized to increase the efficiency of flight that includes a horizontal component. For example, when the aerial vehicle 100 is traveling in a direction that includes a horizontal component, the thrusting motors 110 may be engaged to provide a horizontal thrust force via the thrusting propellers 112 to propel the aerial vehicle 100 horizontally. As a result, the speed and power utilized by the lifting motors 106 may be reduced. Alternatively, in selected implementations, the thrusting motors may be oriented at an angle greater or less than ninety degrees with respect to the perimeter frame 104 and the central frame 107 to provide a combination of thrust and lift.

In the example illustrated in FIG. 1, the aerial vehicle 100 includes two thrusting motors 110-1, 110-2 and corresponding thrusting propellers 112-1, 112-2. Specifically, in the illustrated example, there is a front thrusting motor 110-1 coupled to and positioned near an approximate mid-point of the front wing 120. The front thrusting motor 110-1 is oriented such that the corresponding thrusting propeller 112-1 is positioned inside the perimeter frame 104. The second thrusting motor is coupled to and positioned near an approximate mid-point of the lower rear wing 124. The rear thrusting motor 110-2 is oriented such that the corresponding thrusting propeller 112-2 is positioned inside the perimeter frame 104.

While the example illustrated in FIG. 1 illustrates the aerial vehicle with two thrusting motors 110 and corresponding thrusting propellers 112, in other implementations, there may be fewer or additional thrusting motors and corresponding thrusting propellers. For example, in some implementations, the aerial vehicle 100 may only include a single rear thrusting motor 110 and corresponding thrusting propeller 112. In another implementation, there may be two thrusting motors and corresponding thrusting propellers mounted to the lower rear wing 124. In such a configuration, the front thrusting motor 110-1 may be included or omitted from the aerial vehicle 100. Likewise, while the example illustrated in FIG. 1 shows the thrusting motors oriented to position the thrusting propellers inside the perimeter frame 104, in other implementations, one or more of the thrusting motors 110 may be oriented such that the corresponding thrusting propeller 112 is oriented outside of the protective frame 104. In a similar manner, there may be additional or fewer camera enclosures 101. For example, there may be additional camera enclosures 101 mounted along the side rails 130 and/or on the upper or lower side of the hub 108.

The perimeter frame 104 provides safety for objects foreign to the aerial vehicle 100 by inhibiting access to the lifting propellers 102 from the side of the aerial vehicle 100, provides protection to the aerial vehicle 100, and increases the structural integrity of the aerial vehicle 100. For example, if the aerial vehicle 100 is traveling horizontally and collides with a foreign object (e.g., wall, building), the impact between the aerial vehicle 100 and the foreign object will be with the perimeter frame 104, rather than a propeller. Likewise, because the frame is interconnected with the central frame 107, the forces from the impact are dissipated across both the perimeter frame 104 and the central frame 107.

The perimeter frame 104 also provides a surface upon which one or more components of the aerial vehicle 100 may be mounted. Alternatively, or in addition thereto, one or more components of the aerial vehicle may be mounted or positioned within the cavity of the portions of the perimeter frame 104, such as camera enclosures 101. For example, one or more antennas may be mounted on or in the front wing 120. The antennas may be used to transmit and/or receive wireless communications. For example, the antennas may be utilized for Wi-Fi, satellite, near field communication ("NFC"), cellular communication, or any other form of wireless communication. Other components, such as cameras, time of flight sensors, accelerometers, inclinometers, distance-determining elements, gimbals, Global Positioning System (GPS) receiver/transmitter, radars, illumination elements, speakers, and/or any other component of the aerial vehicle 100 or the aerial vehicle control system (discussed below), etc., may likewise be mounted to or in the perimeter frame 104. Likewise, identification or reflective identifiers may be mounted to the perimeter frame 104 to aid in the identification of the aerial vehicle 100.

In some implementations, the perimeter frame 104 may also include a permeable material (e.g., mesh, screen) that extends over the top and/or lower surface of the perimeter frame 104 enclosing the central frame, lifting motors, and/or lifting propellers.

An aerial vehicle control system 114 is also mounted to the central frame 107. In this example, the aerial vehicle control system 114 is mounted to the hub 108 and is enclosed in a protective barrier. The protective barrier may provide the control system 114 with weather protection so that the aerial vehicle 100 may operate in rain and/or snow without disrupting the control system 114. In some implementations, the protective barrier may have an aerodynamic shape to reduce drag when the aerial vehicle is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the aerial vehicle 100 includes one or more power modules (not shown). The power modules may be positioned inside the cavity of the side rails 130-1, 130-2. In other implementations, the power modules may be mounted or positioned at other locations of the aerial vehicle. The power modules for the aerial vehicle may be in the form of battery power, solar power, gas power, super capacitor, fuel cell, alternative power generation source, or a combination thereof. The power module(s) are coupled to and provide power for the aerial vehicle control system 114, the lifting motors 106, the thrusting motors 110, and the payload engagement mechanism (not shown).

In some implementations, one or more of the power modules may be configured such that it can be autonomously removed and/or replaced with another power module while the aerial vehicle is landed or in flight. For example, when the aerial vehicle lands at a location, the aerial vehicle may engage with a charging member at the location that will recharge the power module.

As mentioned above, the aerial vehicle 100 may also include a payload engagement mechanism. The payload engagement mechanism may be configured to engage and disengage items and/or containers that hold items (payload). In this example, the payload engagement mechanism is positioned beneath and coupled to the hub 108 of the frame 104 of the aerial vehicle 100. The payload engagement mechanism may be of any size sufficient to securely engage and disengage a payload. In other implementations, the payload engagement mechanism may operate as the container in which it contains item(s). The payload engagement mechanism communicates with (via wired or wireless communication) and is controlled by the aerial vehicle control system 114. Example payload engagement mechanisms are described in co-pending patent application Ser. No. 14/502,707, filed Sep. 30, 2014, titled "UNMANNED AERIAL VEHICLE DELIVERY SYSTEM," the subject matter of which is incorporated by reference herein in its entirety.

Figure 2:
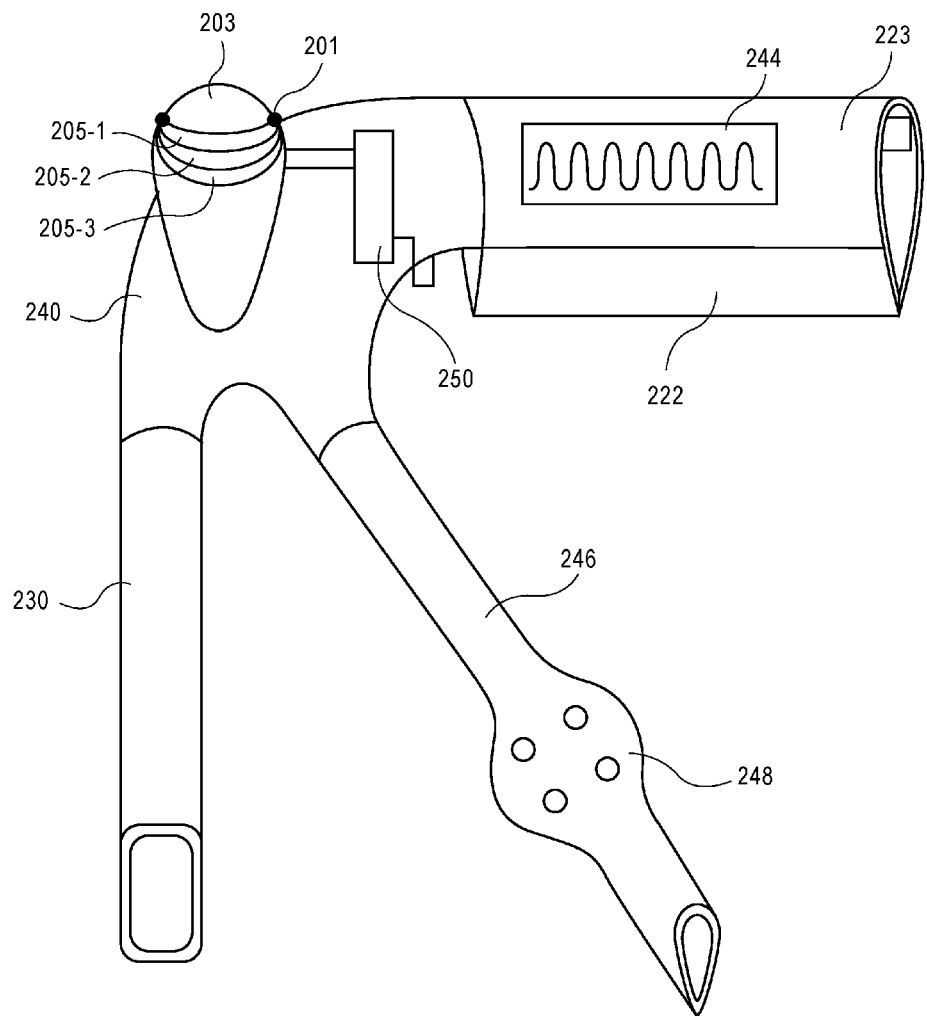
FIG. 2 depicts a view of a portion of an aerial vehicle perimeter frame with a camera enclosure, according to an implementation.

FIG. 2 depicts a partial view of a perimeter frame with a camera enclosure 201, according to an implementation. The illustration in FIG. 2 includes a front left corner junction 240, a portion of a horizontal side rail 230, a portion of a front wing 223, and a portion of a motor arm 246. The camera enclosure 201 encases, encloses, or otherwise houses one or more cameras and/or other input/output components, such as an illumination element, microphone, distance-determining element, GPS, accelerometer, inclinometer, speaker, etc. The camera enclosure 201 may include a substantially spherical or bulbous portion 203 that is transparent or semi-transparent such that a camera positioned within the camera enclosure may obtain images of objects in the vicinity of the aerial vehicle through the substantially spherical or bulbous portion 203.

In some implementations, the camera may be at a fixed position within the camera enclosure 201. In other implementations, the camera may be mounted on a two or three-axis gimbal such that the camera may be moved within the camera enclosure 201.

In some implementations, components of a light alteration assembly, such as a controller 250, and/or one or more adjustable filters 205 may be coupled to the frame and positioned adjacent to the camera enclosure 201. In this example, the light alteration assembly includes multiple filters 205-1, 205-2, 205-3 that are hingedly coupled to either side of the camera enclosure 201 and configured such that the controller 250 may move one or more of the filters 205 to position one or more filters in front of the substantially spherical portion 203 of the camera enclosure. For example, a camera may measure an exposure level or intensity of light entering a lens of the camera. If the measured intensity of light is too high, the controller 250 may position a first filter 205-1 in front of the transparent portion of the camera enclosure 201, thereby filtering or reducing the intensity of light entering the lens of the camera.

In some implementations, each of the filters may block or reduce a different amount of light. The camera may measure a light intensity and the controller 250 of the light alteration assembly may determine an amount of light that is to be filtered to achieve a desired light intensity at the camera. Based on the determined amount of light that is to be filtered, the controller selects one or a combination of filters that will achieve the desired filtering. The determined filter or combination of filters are then rotated about the hinges such that they are positioned in front of the substantially spherical portion of the camera enclosure and filter the intensity of light reaching the lens of the camera. In some implementations, a single filter may be selected to filter the light. In other implementations, a combination of filters may be utilized. Having multiple filters 205 hingedly coupled to the camera enclosure 201 increases the variety and/or types of filtering that may be done at the camera enclosure because any combination of one or more of the filters 205 may be positioned in front of the camera by rotating it about the camera enclosure. In still other implementations, a filter may only be partially positioned in front of the lens of the camera so that it only alters a portion of the light entering the lens of the camera.

Because the camera enclosure includes a substantially spherical portion, the filters are curved and fit closely against the exterior of the substantially spherical portion 203 of the camera enclosure 201. The curved shape and close fit provide good aerodynamics for horizontal flight. In other implementations, the filters may be hingedly coupled to an interior of the camera enclosure and rotated about the interior of the camera enclosure. In other implementations, the portion of the closure may be a shape different than substantially spherical and the filters may have other forms to move with respect to the portion of the enclosure.

The filters may be of any size, shape, and/or material. In some implementations, the filters are curved in a manner similar to the shape of the substantially spherical portion of the camera enclosure and have a width that covers a majority of the exposed portion of the substantially spherical portion of the camera enclosure. The filters may be formed of any type of material that can filter light. For example, the filters may be glass, plastic, etc. Likewise, any type of filter that filters, reduces, and/or otherwise alters light as it passes through the filter may be utilized with the implementations described herein. For example, the filters may be any one or any combination of a polarizing filter, a neutral density filter, a hard-edge graduated neutral density filter, a soft-edge graduated neutral density filter, a reverse graduated neutral density filter, a color filter, a cooling filter, a warming filter, a wavelength filter, a photochromic filter, an electrochromic filter, a thermal filter, an infrared filter, a near infrared filter, etc.

Also as illustrated in FIG. 2, the front wing 223 may include an antenna 244 that is surface mounted to a side of the front wing 223 or embedded inside the surface of the front wing 223. In implementations in which the antenna is embedded in the wing, the surface of the wing adjacent to or covering the antenna may be formed of a material, such as Kevlar, through which the antenna may radiate and/or receive waveform signals. Alternatively, or in addition thereto, the wing may include an open port near the antenna, thereby allowing the antenna to radiate and/or receive waveform signals through the open port.

The portion of the motor arm 246 illustrated in FIG. 2 shows a motor mount 248 to which one or more lifting motors may be mounted. As discussed above, the lifting motors may be mounted to the upper and/or underneath surface of the motor arm. For example, a lifting motor may be secured to the motor arm 246 at the motor mount 248 by passing screws through the openings in the motor mount 248 and securing the lifting motor to the motor mount 248 with the screws.

Figure 3:
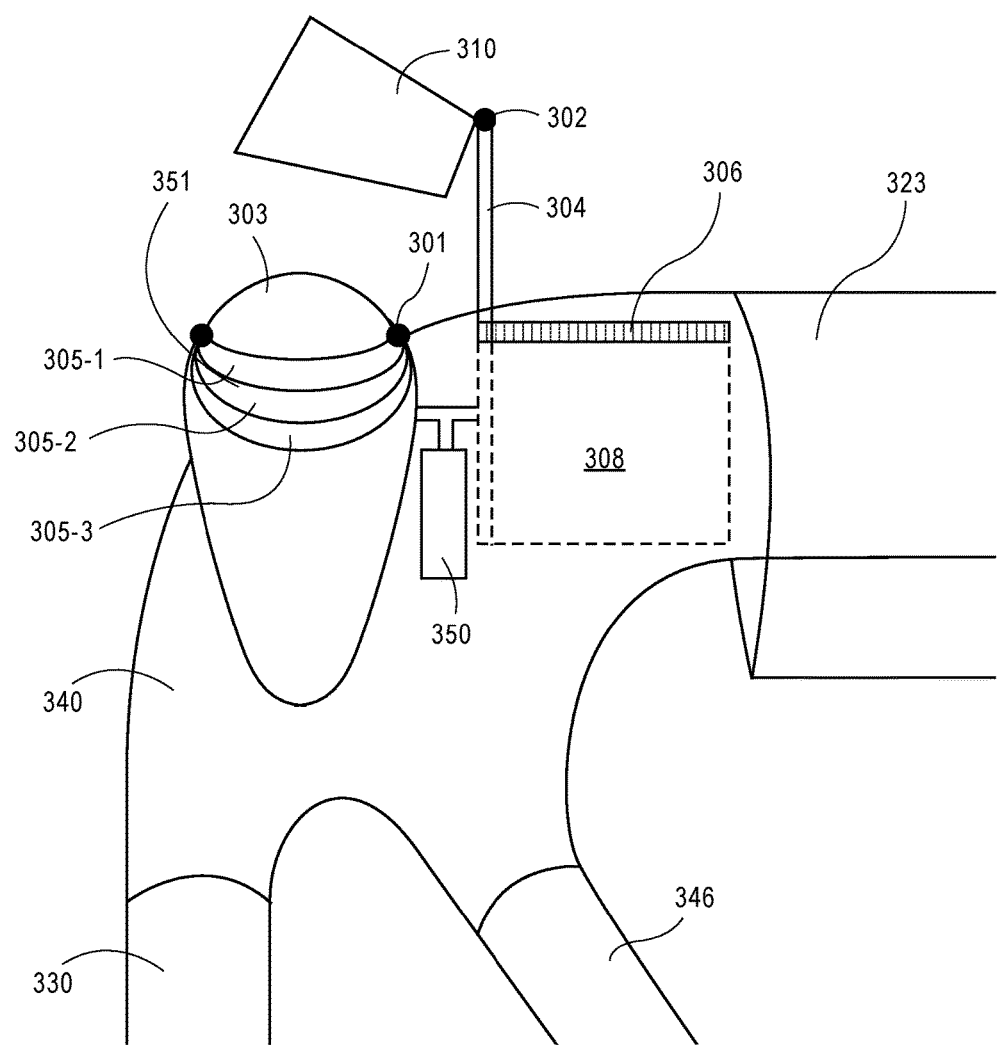
FIG. 3 depicts a view of a portion of an aerial vehicle perimeter frame with a visor and a camera enclosure, according to an implementation.

FIG. 3 depicts a view of a portion of an aerial vehicle perimeter frame with a visor and a camera enclosure, according to an implementation. Similar to FIG. 2, the illustration in FIG. 3 includes a front left corner junction 340, a portion of a horizontal side rail 330, a portion of a front wing 323, and a portion of a motor arm 346. The camera enclosure 301 encases, encloses, or otherwise houses one or more cameras and/or other input/output components, such as an illumination element, microphone, distance-determining element, GPS, accelerometer, inclinometer, speaker, etc. The camera enclosure 301 may include a substantially spherical or bulbous portion 303 that is transparent or semi-transparent such that a camera positioned within the camera enclosure may obtain images of objects in the vicinity of the aerial vehicle through the substantially spherical or bulbous portion 303.

In some implementations, the camera may be at a fixed position within the camera enclosure 301. In other implementation the camera may be mounted on a two or three-axis gimbal such that the camera may be moved within the camera enclosure 301.

In some implementations, components of a light alteration assembly, such as a controller 350, and/or one or more adjustable filters 305 may be coupled to the frame and positioned adjacent to the camera enclosure 301. Likewise, in this example, the light alteration assembly also includes an adjustable visor 310. The adjustable visor may be moved between an extended position, as illustrated, and a retracted position in which the visor is retracted toward or into the frame of the aerial vehicle. In this example, the visor 310 is affixed to a rotatable hinge 302 that is mounted on the end of an extension arm 304. The rotatable hinge 302 and the extension arm are controlled by the controller 205.

The rotatable hinge 302 is configured to move the visor in any direction (e.g., x, y, or z) such that the visor can be positioned at any angle or orientation with respect to the camera. The extension arm 304 may be gear driven and capable of extending the visor different distances from the frame of the aerial vehicle. In other implementations, the extension arm 304 may use other means for adjustment, such as pneumatics, cables, etc.

When retracted, the hinge 302 aligns the visor with a housing 308 and the extension arm 303 and the coupled visor 310 are retracted into the housing 308. In this example, the housing is internal to the frame of the aerial vehicle. In another example, the housing may be on the surface of the frame of the aerial vehicle. When the visor is retracted into the housing, the aerodynamics of the aerial vehicle are not significantly impacted by the visor 310.

The opening of the housing may include flexible sweeps 306 through which the extension arm 304 and visor 310 pass. The sweeps 306 remove debris from the extension arm 304 or visor 310 and reduce airflow into the housing, thereby reducing any negative aerodynamic impact from the housing 308.

The visor 310 may be formed of any substantially opaque material, such as plastic, wood, rubber, fabric, etc. When the visor 310 is in the extended position, it blocks or shades at least a portion of light from entering a lens of the camera that is within the camera housing 301. For example, as discussed further below with respect to FIG. 5, the camera may measure an intensity of light entering the lens of the camera. If the intensity of light exceeds a threshold, the visor may be moved to an extended position and oriented to block or shade light from entering the camera.

In some implementations, the controller 350 may determine or receive information indicating a position of the aerial vehicle and a position of the light source. Based on those positions, the controller 350 provides instructions that cause the extension arm 304 to extend from the frame a determined amount and cause the hinge 302 to rotate the visor to a determined position between the light source and the camera. When the visor is in the determined position, it blocks at least a portion of the light from entering the lens of the camera.

As illustrated, the light alteration assembly may include a controller 350, one or more filters 305, and the adjustable visor 310. In other implementations, the light alteration assembly may only include the controller 350 and the visor 310. In still other examples, the light alteration assembly may only include the controller 350 and the filters 305. It will be appreciated that, while the controller 350 is illustrated as being positioned adjacent the filter 305 and/or visor 310, in other implementations, the controller 350 may be positioned elsewhere on the aerial vehicle and/or may be incorporated into other components of the aerial vehicle control system, as discussed below with respect to FIG. 7. For example, in implementations in which the aerial vehicle includes multiple cameras at different locations on the aerial vehicle, the aerial vehicle may likewise include multiple light alteration assemblies. For example, a light alteration assembly may be positioned adjacent each camera or group of cameras. In such an implementation, instead of including a separate controller from each light alteration assembly, a single controller may be utilized to independently control or independently adjust each filter and/or visor of each light alteration assembly.

Figure 4:
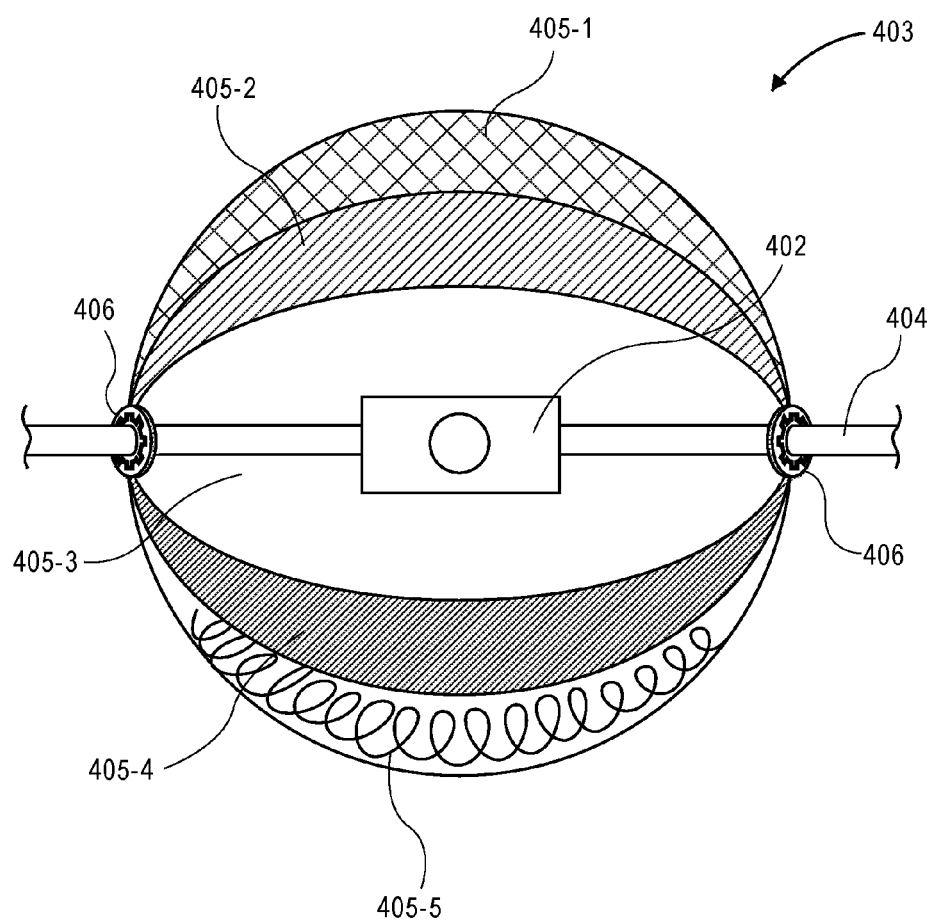
FIG. 4 depicts a view of a camera enclosure, according to an implementation.

FIG. 4 depicts a view of a substantially spherical portion 403 of the camera enclosure 403, according to an implementation. In this example, rather than having the filters discussed above be hingedly coupled to the exterior and/or interior of the substantially spherical portion of the camera enclosure, the substantially spherical portion 403 of the camera enclosure is formed of different filters 405. For example, the substantially spherical portion 403 is formed of a series of filters 405-1, 405-2, 405-3, each filter providing a different amount or type of light filtering. The camera 402 may be coupled to the support arm 404 that extends through the camera enclosure such that the position of the camera is fixed.

Based on a measured intensity of light entering the lens of the camera 402, the substantially spherical portion 403 of the camera enclosure may be rotated about the support arm 404 until the desired filter 405 is in front of the camera 402 and altering the light entering the lens of the camera. For example, if the controller of the light alteration assembly determines that filter 405-1 is to be used to alter the light entering the lens of the camera 402, the controller may engage the gears 406. The gears 406 cause the substantially spherical portion 403 to rotate about the support arm 404 until the filter 405-1 is positioned in front of the camera and altering the light entering the lens of the camera 402.

While the example illustrated in FIG. 4 shows the substantially spherical portion including different filter segments and that the substantially spherical portion is rotatable about the support arm 402 using gears 406, in some implementations, additional adjustable filters, such as those discussed above with respect to FIG. 2, may also be included in the light alteration assembly. For example, additional curved filters that fit around the interior and/or exterior of the substantially spherical portion may be adjustably coupled to the support arm 404 on either side of the substantially spherical portion 403. In such an implementation, the controller may engage the gears 406 and cause the substantially spherical portion to rotate and/or adjust the position of one or more of the additional filters. For example, the controller may rotate the substantially spherical portion such that filter 405-1 is in front of the camera and filtering light entering the camera and position an additional filter in front of the camera to provide additional filtering of light entering the camera.

Likewise, while the examples discussed herein primarily focus on altering light by reducing the intensity of light, in other implementations, components of the light alteration assembly may provide other forms of light alteration. For example, a component may alter a wavelength of the light, filter out particular colors of light, etc.

Figure 5:
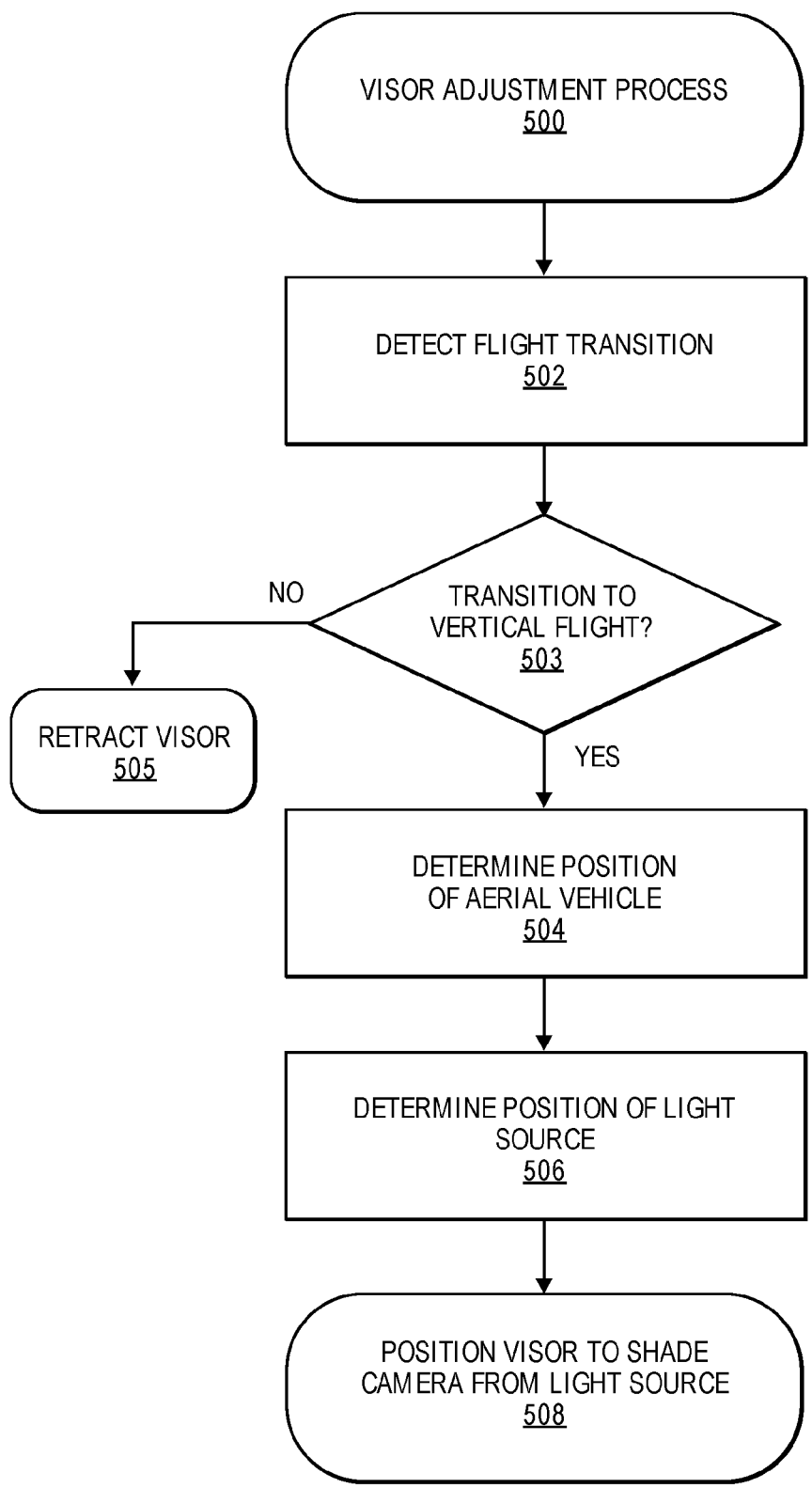
FIG. 5 is a flow diagram illustrating an example visor adjustment process, according to an implementation.

FIG. 5 is a flow diagram illustrating an example visor adjustment process 500, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins by detecting a flight transition, as in 502. As discussed above, a flight transition occurs when the aerial vehicle is transitioning from vertical flight to horizontal flight or transitioning from horizontal flight to vertical flight. Multiple flight transitions may occur during a single flight of an aerial vehicle. For example, if an aerial vehicle is being used to deliver an item ordered by a customer from an electronic commerce (e-commerce) website, the aerial vehicle may be loaded with the item (generally referred to herein as a payload) and begin a first vertical flight in which the aerial vehicle vertically ascends from a source location, such as a materials handling facility. When vertically ascending, the aerial vehicle may primarily use the lifting motors and lifting propellers to navigate and lift the aerial vehicle.

Once the aerial vehicle has reached a desired altitude (e.g., 120 meters), a flight transition occurs in which the aerial vehicle transitions from vertical flight to horizontal flight. During horizontal flight, the aerial vehicle may primarily utilize the thrusting motors and thrusting propellers to navigate the aerial vehicle in a substantially horizontal direction. As discussed above, the wings of the aerial vehicle provide lift as the aerial vehicle is thrusted horizontally.

When the aerial vehicle reaches a position above the user specified delivery location, another flight transition occurs in which the aerial vehicle transitions from horizontal flight to vertical flight and descends toward the delivery location and delivers the payload. Following payload delivery, the aerial vehicle then ascends away from the delivery location.

Once the aerial vehicle ascends to a desired altitude, a third flight transition occurs in which the aerial vehicle again transitions from vertical flight to horizontal flight. The aerial vehicle will then navigate to another location, such as another materials handling facility, landing area, etc. When the aerial vehicle reaches a position above the location, a fourth flight transition occurs in which the aerial vehicle again transitions from horizontal flight to vertical flight and descends to the location.

When the aerial vehicle is in vertical flight, the cameras may be utilized to obtain images of the area around the aerial vehicle. The obtained images may be processed to detect objects in the vicinity of the aerial vehicle so that the aerial vehicle can safely navigate within the area and avoid any objects.

Upon detection of a flight transition, a determination is made as to whether the aerial vehicle is transitioning to vertical flight, as in 503. If it is determined that the aerial vehicle is not transitioning to vertical flight (i.e., the aerial vehicle is transitioning to horizontal flight), the visor is retracted toward the frame of the aerial vehicle, as in 505. When the visor is retracted toward the frame of the aerial vehicle, the visor does not negatively impact the aerodynamics of the aerial vehicle. Likewise, forces generated from air as the aerial vehicle moves in a horizontal direction at a high rate of speed will not potentially damage the visor because it is retracted and out of the path of the airflow.

If it is determined that the aerial vehicle is transitioning to vertical flight, a position of the aerial vehicle is determined, as in 504. The position of the aerial vehicle may include, but is not limited to, the orientation of the aerial vehicle, the heading of the aerial vehicle, the altitude of the aerial vehicle, the geographic coordinates of the aerial vehicle, etc. In addition to determining the position of the aerial vehicle, the position of the light source, such as the sun, is determined as in 506. If the light source is the sun, as is known in the art, the position of the sun may be determined as a function of both time and the geographic coordinates of the aerial vehicle. If the light source is another object, such as a street lamp, lighthouse, etc., the position of the light source may be measured using the cameras of the aerial vehicle. For example, an intensity of light may be measured at each camera and a direction or approximate position of the light source with respect to the aerial vehicle determined based on the measured intensity of light at each camera. In other implementations, one or more sensors (e.g., light sensor, thermal imaging sensor, or infrared sensor) positioned on the aerial vehicle may be used to detect and/or measure light. Based on the detected and/or measured light, a direction or position of the light source may be determined.

Based on the determined position of the aerial vehicle and the determined position of the light source, the visor is moved to an extended position in which the visor is positioned between the camera of the aerial vehicle and the light source, thereby blocking or shading at least a portion of the light from the light source from entering the lens of the camera, as in 508. In some implementations, additional measurements may be obtained from the camera and the position of the visor adjusted until a sufficient amount of light from the light source is blocked or shaded.

Figure 6:
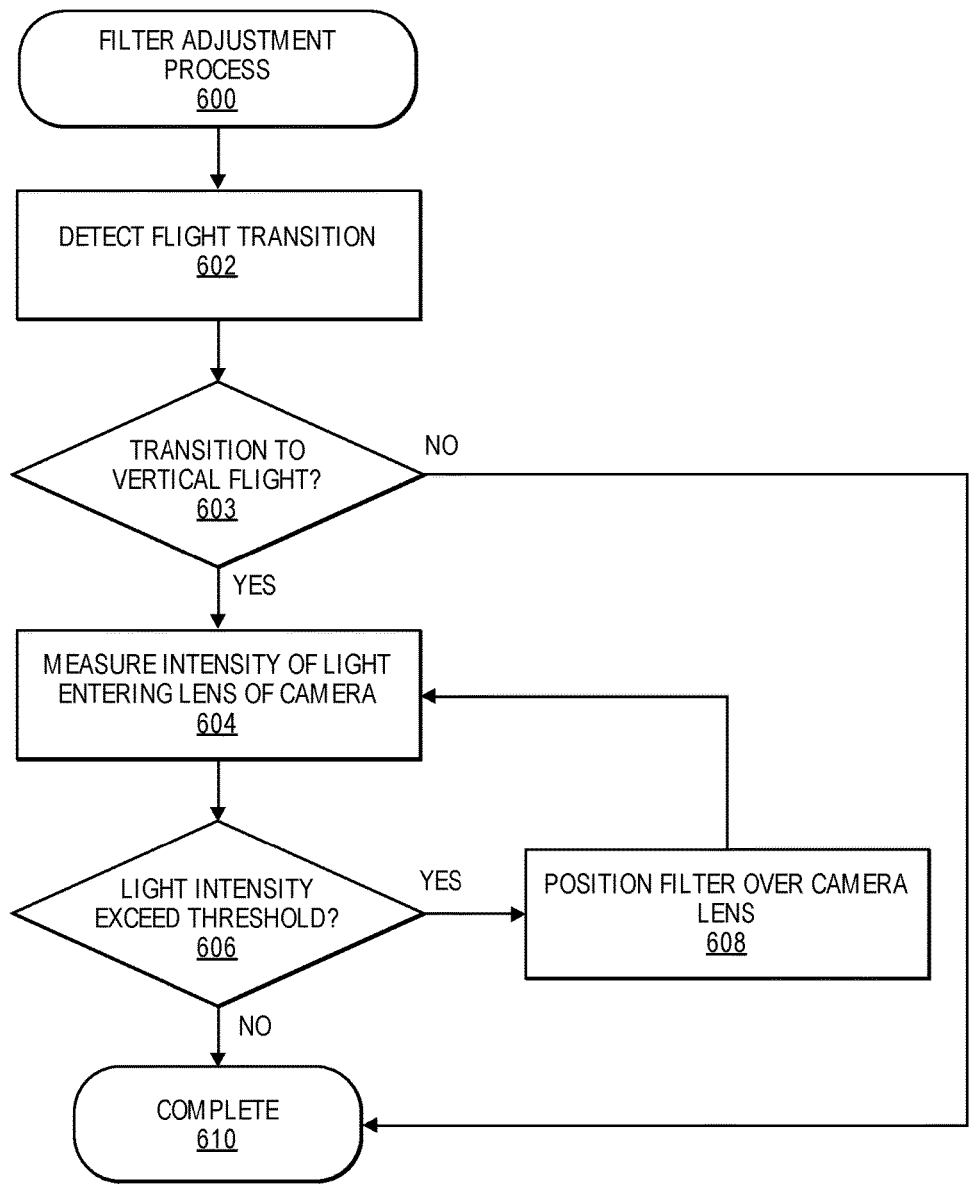
FIG. 6 is a flow diagram illustrating an example filter adjustment process, according to an implementation.

FIG. 6 is a flow diagram illustrating an example filter adjustment process 600, according to an implementation. Similar to the discussion with respect to FIG. 5, the example process 600 detects a flight transition, as in 602, and a determination is made as to whether the aerial vehicle is transitioning to vertical flight, as in 603. If it is determined that the aerial vehicle is not transitioning to vertical flight (i.e., the aerial vehicle is transitioning to horizontal flight), the example process 600 completes, as in 610. However, if it is determined that the aerial vehicle is transitioning to vertical flight, the intensity of light entering the lens of the camera is measured, as in 604. The intensity of light entering the lens of the camera may be determined based on the exposure level measured by the camera. In other examples, rather than or in addition to measuring the intensity of light entering the lens of the camera, a sensor may be positioned on or adjacent to the camera that is used to measure the intensity of light.

Based on the measured intensity of light, a determination is made as to whether the intensity of light exceeds a defined threshold, as in 606. The defined threshold may be any specified amount and may vary for different types of cameras, different areas, different times of day, etc. If it is determined that the light intensity exceeds the threshold, a filter may be positioned over the lens of the camera, as in 608. Positioning a filter over the lens of the camera may be done using any one or more of the techniques discussed above. For example, the filters may be positioned on an interior or exterior of the camera enclosure and adjusted so that a particular filter is positioned in front of the lens of the camera and altering light entering the lens of the camera. Alternatively, or in addition thereto, the camera enclosure may include a substantially spherical portion that is formed of different filters. The substantially spherical portion may be rotated to position a desired filter in front of the lens of the camera to alter light before the light enters the lens of the camera.

Upon positioning one or more filters in front of the lens of the camera, the example process 600 returns to block 604 and continues. Specifically, the light intensity may again be measured to confirm that the selected filter is altering the light such that a higher quality image may be obtained using the camera. If it is determined that the intensity of light entering the lens of the camera does not exceed the threshold, the example process completes, as in 610.

While the example process 600 describes adjusting filters to alter light entering the camera when the aerial vehicle is in vertical flight, in some implementations, the example process may be performed any time the vehicle is airborne and/or using the cameras of the aerial vehicle to obtain images. In such implementations, flight transitions may not be considered and the cameras may periodically measure the intensity of light entering the lens of the camera at any time the camera and/or the aerial vehicle is operational and in-flight. If the intensity of light entering the lens of the camera exceeds the threshold, the filters may be adjusted, as discussed with respect to FIG. 6. Because the filters may be incorporated into the substantially spherical portion of the camera enclosure, positioned on the interior of the camera enclosure and/or positioned along the exterior of the camera enclosure, the filters do not cause a significant amount of drag and therefore have limited if any negative effects on aerodynamics as the aerial vehicle is moving in a horizontal direction. As such, the filters may be used during any flight of the aerial vehicle to filter light entering the lens of the camera.

Images obtained by the cameras may be processed using a variety of techniques. For example, object recognition, edge detection, and/or other image processing algorithms may be used to process the images and detect objects represented in the images. Such processing may be used to aid in guiding the vehicle. Likewise, in some implementations, one or more systems or processing algorithms may utilize information regarding the position of one or more components of the light alteration assembly. For example, an image processing algorithm may determine whether a component of the light alteration assembly was used to alter light in which an image was obtained. Such information may aid in image processing or analysis. As another example, the controller of the light alteration assembly may use information from one light alteration assembly positioned adjacent a first camera enclosure to position filters for another light alteration assembly positioned adjacent a second camera enclosure of the aerial vehicle. For example, if the aerial vehicle is oriented at zero degrees and begins to rotate to ninety degrees, the controller may determine a filter being used to alter light for a first camera enclosure that is positioned on one side of the aerial vehicle and predictively adjust a filter of a second camera enclosure positioned on an opposing side of the aerial vehicle so that the light entering the camera within the second enclosure is altered as the aerial vehicle rotates.

Figure 7:
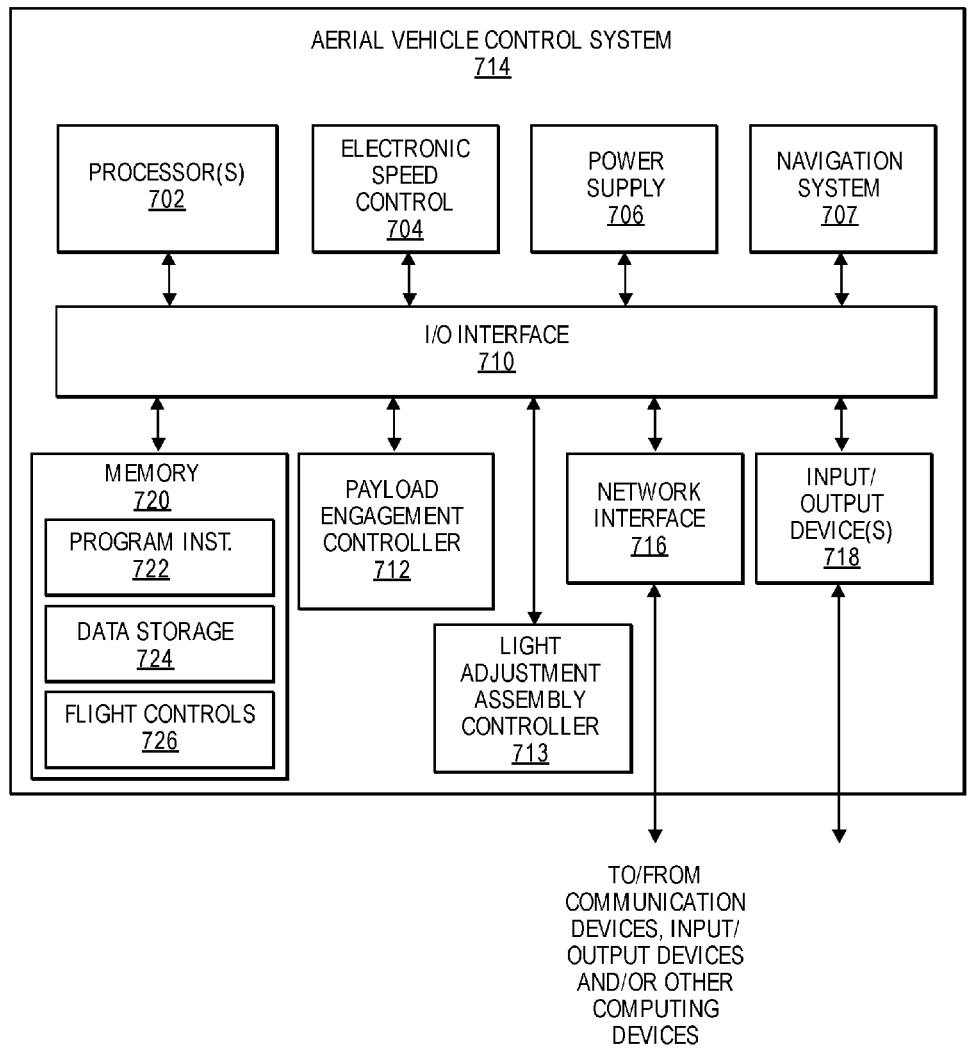
FIG. 7 is a block diagram of an illustrative implementation of an aerial vehicle control system that may be used with various implementations.

FIG. 7 is a block diagram illustrating an example aerial vehicle control system 714. In various examples, the block diagram may be illustrative of one or more aspects of the aerial vehicle control system 114 (FIG. 1) that may be used to implement the various systems and methods discussed herein and/or to control operation of the aerial vehicles described herein. In the illustrated implementation, the aerial vehicle control system 714 includes one or more processors 702, coupled to a memory, e.g., a non-transitory computer readable storage medium 720, via an input/output (I/O) interface 710. The aerial vehicle control system 714 may also include electronic speed controls 704 (ESCs), power supply modules 706, a navigation system 707, and/or a payload engagement controller 712. In some implementations, the navigation system 707 may include an inertial measurement unit (IMU). The aerial vehicle control system 714 may also include a network interface 716, and one or more input/output devices 718.

In various implementations, the aerial vehicle control system 714 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, flight paths, flight control parameters, and/or data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 720 as program instructions 722, data storage 724 and flight controls 726, respectively. In other implementations, program instructions, data, and/or flight controls may be received, sent, or stored upon different types of computer-accessible media, such as non-transitory media, or on similar media separate from the non-transitory computer readable storage medium 720 or the aerial vehicle control system 714. Generally speaking, a non-transitory, computer readable storage medium may include storage media or memory media such as magnetic or optical media, e.g., disk or CD/DVD-ROM, coupled to the aerial vehicle control system 714 via the I/O interface 710. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface 716 or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The ESCs 704 communicate with the navigation system 707 and adjust the rotational speed of each lifting motor and/or the thrusting motor to stabilize the aerial vehicle and guide the aerial vehicle along a determined flight path. The navigation system 707 may include a GPS, indoor positioning system (IPS), IMU or other similar systems and/or sensors that can be used to navigate the aerial vehicle 100 to and/or from a location. The payload engagement controller 712 communicates with actuator(s) or motor(s) (e.g., a servo motor) used to engage and/or disengage items.

As discussed above, the aerial vehicle control system 714 may also include a light alteration assembly controller 713. The controller 713 may communicate with the ESCs 704 and/or the navigation system to determine aerial vehicle position and/or to detect flight transitions. As discussed above, the light alteration assembly controller 713 is used to adjust the visor and/or filters to block, shade, filter and/or otherwise alter light entering the lens of a camera.

The network interface 716 may be configured to allow data to be exchanged between the aerial vehicle control system 714, other devices attached to a network, such as other computer systems (e.g., remote computing resources), and/or with aerial vehicle control systems of other aerial vehicles. For example, the network interface 716 may enable wireless communication between the aerial vehicle that includes the control system 714 and an aerial vehicle control system that is implemented on one or more remote computing resources. For wireless communication, an antenna of an aerial vehicle or other communication components may be utilized. As another example, the network interface 716 may enable wireless communication between numerous aerial vehicles. In various implementations, the network interface 716 may support communication via wireless general data networks, such as a Wi-Fi network. For example, the network interface 716 may support communication via telecommunications networks, such as cellular communication networks, satellite networks, and the like.

Input/output devices 718 may, in some implementations, include one or more displays, imaging devices, thermal sensors, infrared sensors, time of flight sensors, accelerometers, pressure sensors, weather sensors, cameras, gimbals, landing gear, etc. Multiple input/output devices 718 may be present and controlled by the aerial vehicle control system 714. One or more of these sensors may be utilized to assist in landing as well as to avoid obstacles during flight.

As shown in FIG. 7, the memory may include program instructions 722, which may be configured to implement the example processes and/or sub-processes described herein. The data storage 724 may include various data stores for maintaining data items that may be provided for determining flight paths, landing, flight transitions, identifying locations for disengaging items, engaging/disengaging the thrusting motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 714 is merely illustrative and is not intended to limit the scope of the present disclosure. In particular, the computing system and devices may include any combination of hardware or software that can perform the indicated functions. The aerial vehicle control system 714 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 714. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the aerial vehicle control system 714 may be transmitted to the aerial vehicle control system 714 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An aerial vehicle, comprising:
   a frame;
   a camera mounted to the frame;
   an adjustable visor external to the camera and coupled to the frame and movable between a retracted position in which the adjustable visor is retracted toward the frame and an extended position in which the adjustable visor extends away from the frame and blocks at least a portion of light to reduce an intensity of light entering a lens of the camera; and
   a control system, comprising:
      a processor; and
      a memory coupled to the processor and storing program instructions that when executed by the processor cause the processor to at least:
         determine a first flight transition in which the aerial vehicle is transitioning from a first flight that includes a substantially horizontal component to a second flight that includes a substantially vertical component; and
         in response to a determination of the first flight transition, cause the adjustable visor to move from the retracted position to the extended position.

2. The aerial vehicle of claim 1, wherein the program instructions when executed by the processor further cause the processor to at least:
   determine a second flight transition in which the aerial vehicle is transitioning from the second flight to a third flight that includes a substantially horizontal component; and
   in response to a determination of the second flight transition, send instructions that cause the adjustable visor to move from the extended position to the retracted position.

3. The aerial vehicle of claim 1, wherein the program instructions when executed by the processor further cause the processor to at least:
   determine a position of the aerial vehicle;
   determine a position of a light source; and
   wherein the program instructions that cause the adjustable visor to move from the retracted position to the extended position further cause the adjustable visor to move to a determined position with respect to the position of the aerial vehicle and the position of the light source such that the adjustable visor blocks at least a portion of light from the light source.

4. The aerial vehicle of claim 1, wherein the adjustable visor is aligned in the extended position to reduce an intensity of light entering the lens of the camera such that a quality of an image obtained by the camera is improved.

5. A method to operate a camera of an aerial vehicle, the method comprising:
   under control of one or more computing devices configured with executable instructions,
      determining a first flight transition in which the aerial vehicle is transitioning between a first flight that includes a substantially horizontal component and a second flight that includes a substantially vertical component; and
      in response to determining the first flight transition, sending instructions that cause a component of a light alteration assembly that is external to the camera to be positioned between a light source and the camera of the aerial vehicle such that a light is altered prior to the light entering a lens of the camera.

6. The method of claim 5, wherein the component of the light alteration assembly comprises at least one of an adjustable visor that is positionable between an extended position and a retracted position with respect to a frame of the aerial vehicle, or an adjustable filter that may be positioned over the lens of the camera to alter light entering the lens of the camera.

7. The method of claim 5, further comprising:
   determining a position of the aerial vehicle;
   determining a position of the light source;
   determining, based at least in part on the position of the aerial vehicle and the position of the light source, an extended position at which the component of the light alteration assembly is to be positioned such that the light alteration assembly will alter the light entering the lens of the camera; and
   wherein the instructions indicate the extended position.

8. The method of claim 5, further comprising:
   determining an intensity of light entering the lens of the camera;
   selecting a component of the light alteration assembly that will alter an amount of light entering the lens of the camera; and
   wherein the instructions that cause the component of the light alteration assembly to be positioned between the light source and the camera of the aerial vehicle further include instructions that cause the selected component to be positioned over the lens of the camera such that the light is altered by the selected component prior to the light entering the lens of the camera.

9. The method of claim 8, wherein the intensity of light entering the lens is determined based at least in part on an exposure level measured by the camera.

10. The method of claim 5, wherein the second flight comprises at least one of a landing, a takeoff, or a payload delivery.

11. The method of claim 5, wherein the first flight comprises an aerial transport of an item from an origin to a destination.

12. An aerial vehicle, comprising:
   a frame;
   a camera enclosure coupled to the frame;
   a camera positioned within an interior of the camera enclosure such that the camera enclosure encompasses the camera; and
   a light alteration assembly external to the camera and including at least one component that is adjustable with respect to the camera to alter light entering a lens of the camera, wherein the at least one component is incorporated into the camera enclosure, and wherein the at least one component is adjusted in response to a flight transition between a first flight including a substantially horizontal component and a second flight including a substantially vertical component.

13. The aerial vehicle of claim 12, wherein the at least one component of the light alteration assembly includes a filter that may be positioned over the lens of the camera.

14. The aerial vehicle of claim 12, wherein:
the at least one component is incorporated into the camera enclosure as a substantially spherical shape that surrounds the camera;
the substantially spherical shape comprises a plurality of sections, each section of the plurality of sections including a different filter of a plurality of filters; and
a section of the plurality of sections is positioned over the lens of the camera by rotating the substantially spherical shape such that the section is positioned in front of the lens of the camera.

15. The aerial vehicle of claim 12, wherein:
the camera enclosure includes a substantially spherical shape that surrounds the camera;
the at least one component comprises a filter, wherein the filter is hingedly coupled to the substantially spherical shape at a first hinge and a second hinge such that the filter may be moved with respect to the substantially spherical shape; and
the filter is positioned over the lens of the camera by moving the filter with respect to the substantially spherical shape such that the filter is positioned in front of the lens of the camera.

16. The aerial vehicle of claim 15, wherein the light alteration assembly includes a plurality of filters, each of the plurality of filters hingedly coupled to the substantially spherical shape at the first hinge and the second hinge such that each of the plurality of filters may be independently moved with respect to the substantially spherical shape.

17. The aerial vehicle of claim 12, wherein the at least one component comprises an adjustable visor coupled to the frame of the aerial vehicle.

18. The aerial vehicle of claim 17, wherein the adjustable visor may be moved between a retracted position in which the adjustable visor is retracted toward the frame of the aerial vehicle and an extended position in which the adjustable visor extends away from the frame of the aerial vehicle and provides a shade for the camera to alter the light entering the lens of the camera.

19. The aerial vehicle of claim 18, wherein the adjustable visor is positioned within an interior of the frame when in the retracted position.

20. The aerial vehicle of claim 12, wherein the light alteration assembly comprises at least one of a polarizing filter, a neutral density filter, a hard-edge graduated neutral density filter, a soft-edge graduated neutral density filter, a reverse graduated neutral density filter, a color filter, a cooling filter, a warming filter, a wavelength filter, a photochromic filter, an electrochromic filter, a thermal filter, an infrared filter, or a near infrared filter.

* * * * *